United States Patent
Lee

(10) Patent No.: US 7,017,926 B2
(45) Date of Patent: Mar. 28, 2006

(54) FRONT-WHEEL SUSPENSION SYSTEM USING A STEERING GEAR FRAME

(75) Inventor: Unkoo Lee, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 159 days.

(21) Appl. No.: 10/447,356

(22) Filed: May 28, 2003

(65) Prior Publication Data

US 2004/0046348 A1 Mar. 11, 2004

(30) Foreign Application Priority Data

Sep. 5, 2002 (KR) ...................... 10-2002-0053497

(51) Int. Cl.
*B60G 3/04* (2006.01)
(52) U.S. Cl. .............................. 280/124.134; 280/93.51
(58) Field of Classification Search ......... 280/124.134, 280/124.145, 124.15, 124.152, 93.51, 93.513, 280/93.514, 93.515; 74/498
See application file for complete search history.

(56) References Cited

U.S. PATENT DOCUMENTS

| | | | |
|---|---|---|---|
| 3,856,323 A * | 12/1974 | Arning et al. | 280/124.109 |
| 3,864,989 A * | 2/1975 | Jones | 74/498 |
| 4,060,011 A | 11/1977 | Jones | |
| 5,601,304 A * | 2/1997 | Tilly et al. | 280/124.15 |
| 5,992,867 A * | 11/1999 | Kato et al. | 280/124.134 |
| 6,116,627 A * | 9/2000 | Kawabe et al. | 280/124.15 |
| 6,231,062 B1* | 5/2001 | Sutton | 280/124.146 |
| 6,402,170 B1* | 6/2002 | Hurlburt | 280/103 |
| 6,719,314 B1* | 4/2004 | Schote | 280/124.135 |
| 6,783,157 B1* | 8/2004 | Huang et al. | 280/785 |
| 6,866,277 B1* | 3/2005 | Ziech et al. | 280/124.116 |

FOREIGN PATENT DOCUMENTS

| | | |
|---|---|---|
| DE | 19608414 A1 | 9/1997 |
| GB | 1 400 024 | 7/1975 |
| JP | 56-150663 | 11/1981 |
| JP | 2000-218802 | 10/2000 |

* cited by examiner

*Primary Examiner*—Paul N. Dickson
*Assistant Examiner*—L. Rosenberg
(74) *Attorney, Agent, or Firm*—Morgan Lewis & Bockius LLP

(57) ABSTRACT

A front-wheel suspension system comprises a steering gear frame, a control arm mounting connector, a lower control arm, a wheel carrier, and a damping device. The steering gear frame includes a front fixing plate and a rear fixing plate integrally formed on a front side and a rear side of a power cylinder and is coupled to a vehicle body. The control arm mounting connector is fixed in a longitudinal direction under the fixing plate. The lower control arm is provided with a vehicle body side connecting member coupled to both ends of the control arm mounting connector. The wheel carrier couples to a wheel side end portion of the lower control arm, rotatably supports a wheel, and is connected to a tie rod extended from the power cylinder. A damping device absorbs vertical vibration of the wheel.

3 Claims, 3 Drawing Sheets

FRONT-WHEEL SUSPENSION SYSTEM USING A STEERING GEAR FRAME

FIELD OF THE INVENTION

Generally, the present invention relates to a front-wheel suspension system using a steering gear frame. More particularly, the front-wheel suspension system uses an interchangeable steering gear frame, and is thus applicable to various vehicles.

BACKGROUND OF THE INVENTION

Typically, a suspension system of a vehicle is disposed between a vehicle body and a wheel connecting these two rigid bodies through at least one link. The suspension system is vertically supported by a shock absorbing member such as a spring or a hydraulic shock absorber. The system also typically includes several members to harmonize stiffness and flexibility such that relative motion between the vehicle body and the wheel are mechanically harmonized.

A subframe is also typically included in the front-wheel suspension system. The subframe is generally positioned in a longitudinal direction at a front lower portion of a vehicle body connecting the suspension system to the vehicle body. The subframe has a great influence on integrity of the vehicle body. Therefore, the subframe is required to have an integrity greater than a specific level. The subframe must also rigidly support parts of the suspension system disposed on both sides. Because the front wheels are generally used for steering, a steering gear box assembly is also disposed on the subframe. The subframe and steering gear assembly are typically manufactured as separate units and then assembled together. Each of the subframe and steering gear assemblies are required to have relevant integrities in order for them to perform their own roles. Therefore, the size and load of the subframe and the steering gear box assembly increases.

A projection member is also often provided on an upper side of the subframe. The projection member provides for coupling the steering gear box assembly to the subframe. As a result, the gross load becomes even greater. Furthermore, even more space is occupied under the engine compartment as a coefficient of utilization of space of the engine compartment deteriorates.

Drawbacks of the conventional system include a consumption of excessive working time because the subframe and the steering gear box assemblies are assembled in separate processes. Also, an added number of parts are needed for the assemble, increasing manufacturing costs. Furthermore, the lower structure of the vehicle body becomes compacted.

In order to solve the above problems, the applicant provided a steering gear frame assembly in Korea patent application no. 10-2001-0050609. In this steering gear frame assembly, the steering gear box assembly and the subframe are formed as one unit so the overall structure is simplified. However, the size and load of this steering gear frame assembly has remained high. Furthermore, when the type or size of the suspension system is changed, the subframe must also be changed, therefore, the cost for design and manufacture substantially increases.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In a preferred embodiment of the present invention a front-wheel suspension system comprises a steering gear frame, a control arm mounting connector, a lower control arm, a wheel carrier, and a damping device. The steering gear frame includes a front fixing plate and a rear fixing plate integrally formed on a front side and a rear side of a power cylinder, respectively, and coupled to a vehicle body. The control arm mounting connector is fixed and disposed in a longitudinal direction under the fixing plate. The lower control arm is provided with a vehicle body side connecting member that couples to both ends of the control arm mounting connector. The wheel carrier is coupled to a wheel side end portion of the lower control arm and rotatably supports a wheel. The wheel carrier is also connected to a tie rod extending from the power cylinder. The damping device absorbs vertical vibration of the wheel.

Preferably, the control arm mounting connector is provided with coupling holes configured to be coupled to the fixing plate, on both sides of a center portion. A front vehicle body connecting member and a rear vehicle body connecting member, of the lower control arm, are respectively coupled to a front end portion and a rear end portion of the control arm mounting connector.

It is preferable that a front end portion of the control arm mounting connector is configured to be coupled to the lower control arm through a lateral-type rubber bushing. A rear end portion of the control arm mounting connector is configured to be coupled to the lower control arm through a vertical-type rubber bushing.

In another preferred embodiment of the present invention, the front suspension system further comprises a vehicle body mounting connector that is disposed between the steering gear frame and the vehicle body. Preferably, the vehicle body mounting connector is provided with a pair of coupling holes configured to be coupled to the front and rear fixing plates on both sides of a center portion. The vehicle body mounting connector is also provided with a pair of vehicle body mounting holes configured to be coupled to the vehicle body on both ends. It is preferable that the vehicle body mounting connector has an arc shape so that the vehicle body mounting holes are positioned closer to the wheel than the coupling holes.

In yet another preferred embodiment of the present invention a front-wheel suspension system comprises a steering gear frame, a control arm mounting connector, a lower control arm, a wheel carrier, and a damping device. The steering gear frame is configured to be coupled to a vehicle body and includes a power cylinder and a tie rod that is operated by the power cylinder. The control arm mounting connector is configured to be coupled to the steering gear frame and the lower control arm is configured to be coupled to the control arm mounting connector. The wheel carrier is configured to be rotatably coupled to a wheel and is also rotatably coupled to the wheel carrier. The tie rod couples to the wheel carrier and the damping device is connected to the wheel carrier and the vehicle body. The damping unit is configured to absorb shock applied to the wheel.

It is also preferable that the front-wheel suspension system further comprises a vehicle body mounting connector disposed between the steering gear frame and the vehicle body. The steering gear frame is coupled to the vehicle body mounting connector and the vehicle body mounting connector is coupled to the vehicle body.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE INVENTION

Figure 1:
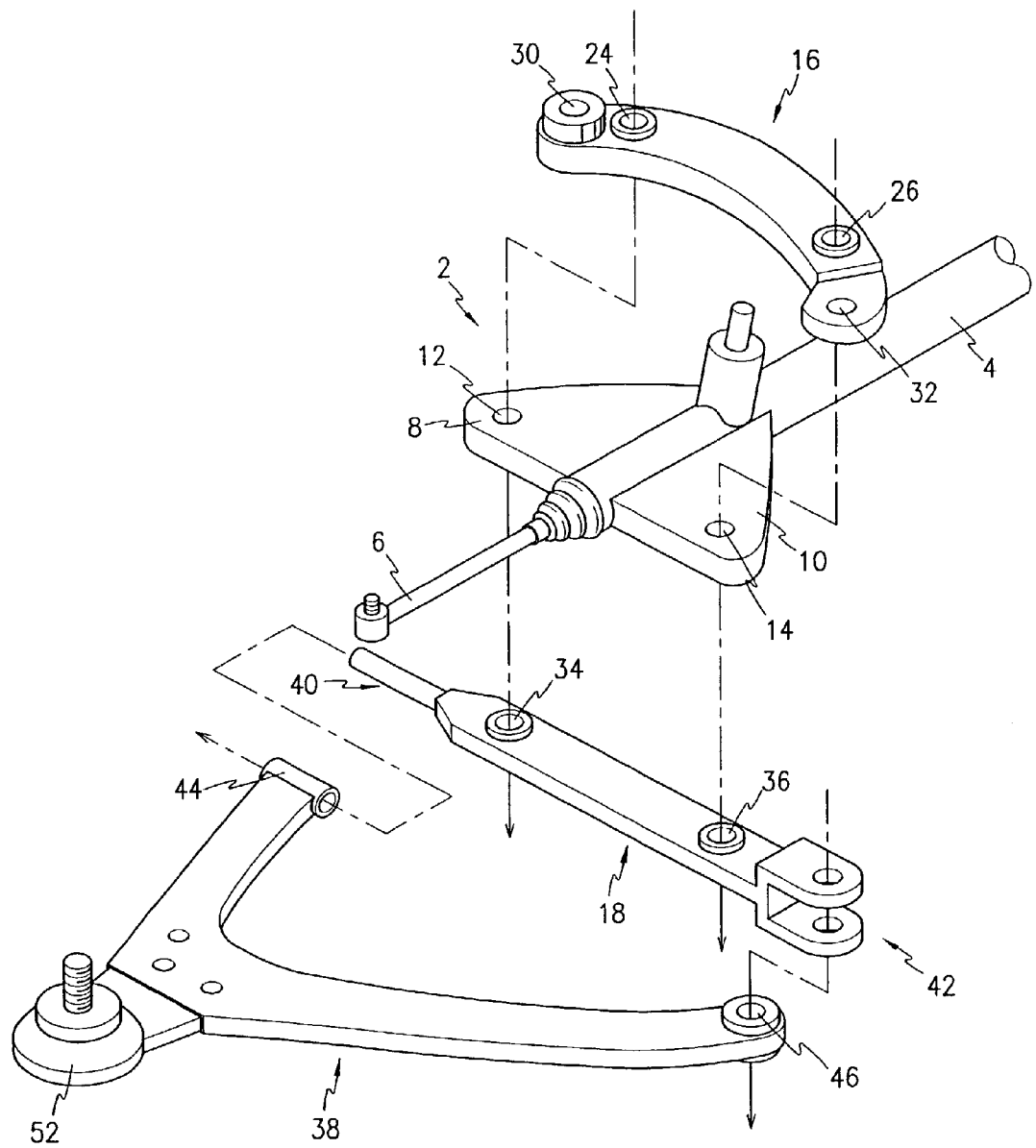
FIG. 1 is an exploded perspective view of a suspension system according to an embodiment of the present invention.

As shown in FIG. 1, a steering gear frame 2 may include a power cylinder 4 from which a tie rod 6 extends. A front fixing plate 8 and a rear fixing plate 10 are integrally formed on either side of each end of the power cylinder 4. In an alternative embodiment, the fixing plates 8 and 10 can be separate plates apart from the power cylinder 4. If the fixing plates 8 and 10 are separate plates, they are coupled to the power cylinder 4 through a coupling method such as welding or the like. It is also possible that the fixing plates 8 and 10 are a part of the power cylinder 4. A first coupling hole 12 and a second coupling hole 14 are respectively perforated through the front fixing plate 8 and the rear fixing plate 10.

A vehicle body mounting connector 16 is disposed above the fixing plates 8 and 10, and a control arm mounting connector 18 is disposed below the fixing plates 8 and 10. A third coupling hole 24 and a fourth coupling hole 26 are formed in the vehicle body mounting connector 16 at positions corresponding to the positions of the first and second coupling holes 12 and 14. A fifth coupling hole 34 and a sixth coupling hole 36 are formed in the control arm mounting connector 18 at positions corresponding to the positions of the first and second coupling holes 12 and 14.

The vehicle body mounting connector 16 is provided with a first vehicle body mounting hole 30 and a second vehicle body mounting hole 32. Coupling members are inserted into the first and second vehicle body mounting holes 30 and 32, thereby the vehicle mounting connector 16 is coupled to a vehicle body 28.

A shape of the vehicle mounting connector 16 can be varied in response to positions of the vehicle body mounting holes 30 and 32. Accordingly, the vehicle mounting connector 16 has a curved shape (that is, an arc shape) such that the vehicle body mounting holes 30 and 32 are positioned closer to the wheel than are the coupling holes 24 and 26. Furthermore, the vehicle mounting connector 16 can be manufactured through various methods. For example, the vehicle mounting connector 16 can be manufactured by welding two steel plates that have undergone a pressing process. As another example, the vehicle mounting connector 16 can be manufactured through injection molding.

The control arm mounting connector 18 is further provided with a front coupling member 40 and a rear coupling member 42 near its respective ends. The front and rear coupling members 40 and 42 are respectively coupled to a front vehicle body side coupling member 44 of a control arm 38 and a rear vehicle body side coupling member 46 of the control arm 38. In an alternative embodiment, a shape of the control arm mounting connector 18 can be varied according to positions of the front and rear coupling members 40 and 42. Accordingly, the control arm mounting connector 18 has a rod shape with a specific length.

Structures of the front and rear coupling members 40 and 42 can be varied according to how they are coupled with the control arm 38. In an embodiment of the present invention, the front coupling member 40 is horizontally coupled to the front vehicle side coupling member 44 of the control arm 38 and the rear coupling member 42 is vertically coupled to the rear vehicle side coupling member 46 of the control arm 38.

Figure 2:
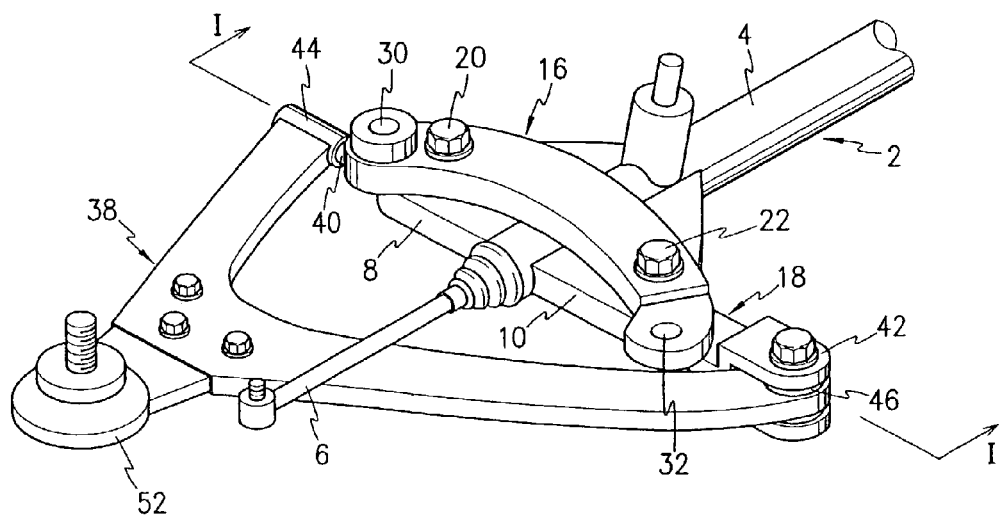
FIG. 2 is a perspective view of a suspension system according to an embodiment of the present invention.
Figure 3:
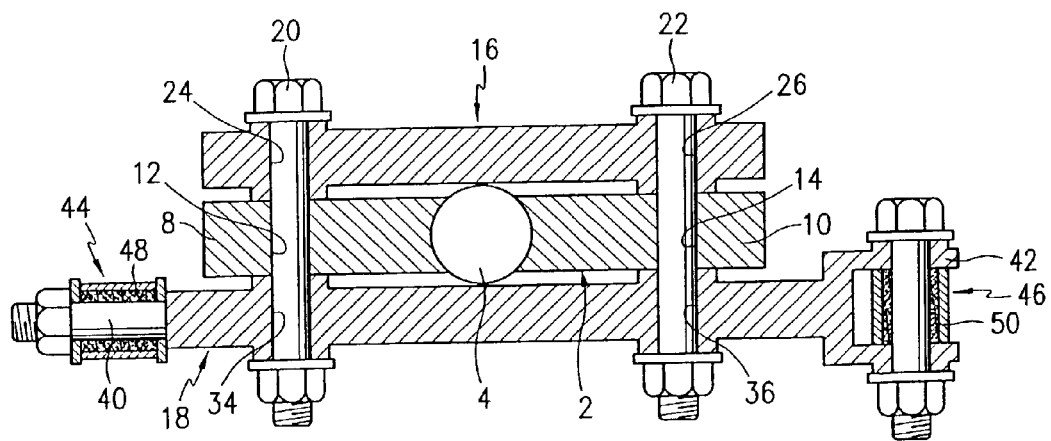
FIG. 3 is a sectional view taken along line I—I of FIG. 2.

As shown in FIGS. 2 and 3, a first coupling member 20 is inserted into the coupling holes 24, 12, and 34, and a second coupling member 22 is inserted into the coupling holes 26, 14, and 36. The steering gear frame 2 and the control arm mounting connector 18 are coupled to the vehicle body 28. The first and second coupling members 20 and 22 can be a bolt and nut assembly or the like.

Preferably, the lower control arm 38 that is coupled to the control arm mounting connector 18 has an "A" shape. A first rubber bushing 48 and a second rubber bushing 50 are respectively disposed in the front and rear vehicle body side coupling members 44 and 46, following this, the front and rear coupling members 40 and 42 of the control arm mounting connector 18 are respectively coupled to the front and rear vehicle body side coupling members 44 and 46. As shown in FIG. 3, the first rubber bushing 48 is preferably a horizontal-type bushing, and the second rubber bushing 50 is preferably a vertical-type bushing.

Figure 4:
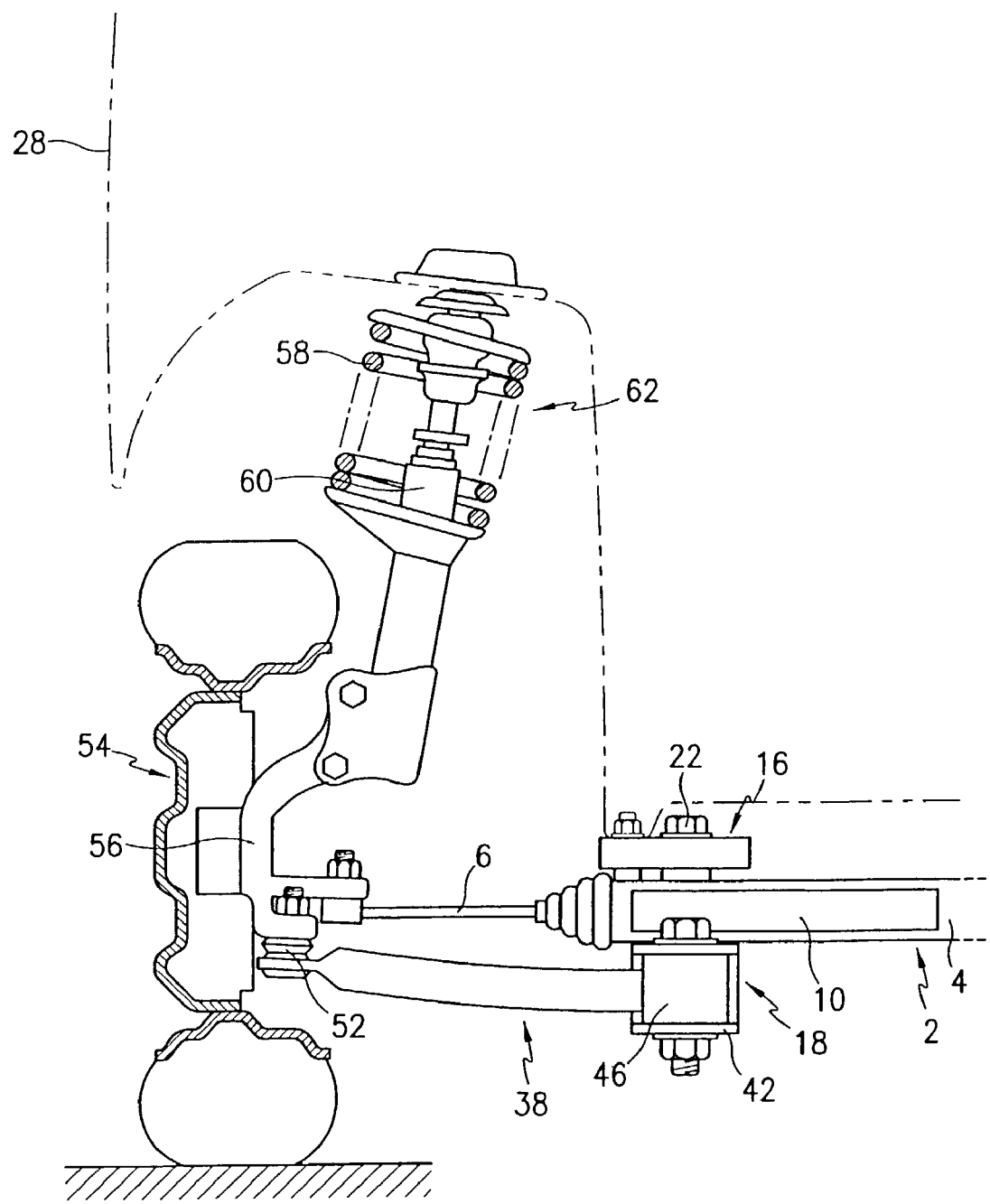
FIG. 4 is a rear view of a suspension system according to an embodiment of the present invention.

FIG. 4 shows a wheel side coupling member 52 of the lower control arm 38 coupled through a ball joint to a lower portion of a wheel carrier 56. The wheel carrier 56 rotatably supports wheel 54. The tie rod 6 is connected to the wheel carrier 56 for steering. An absorbing member is provided between the wheel carrier 56 and the vehicle body 28. The absorbing member can be a strut assembly 62 that is composed of a coil spring 58 and a shock absorber 60 or the like. A lower portion of the strut assembly 62 is coupled to the wheel carrier 56 and an upper portion of the strut assembly 62 elastically supports the vehicle body 28. It is preferable that the upper portion of the strut assembly 62 is slightly slanted toward the vehicle body 28.

Lateral vibration and/or shock transmitted from the wheel is absorbed by the rubber bushings 48 and 50 disposed between the lower control arm 38 and the control arm mounting connector 18. Vertical vibration and/or shock is dampened not only by the rubber bushings 48 and 50 in response to vertical movements of the lower control arm 38 but also by the strut assembly 62 such that little shock is transmitted to the vehicle body 28.

According to an embodiment of the present invention, the vehicle body mounting connector 16 is disposed between the vehicle body 28 and the front and rear fixing plates 8 and 10 of the steering gear frame 2. However, it should be appreciated by a person of ordinary skill in the art that the vehicle body mounting connector 16 can be omitted. That is, under a specific structure, the front and rear fixing plates 8 and 10 can be directly coupled to the vehicle body 28 without the vehicle body mounting connector 16.

In the suspension system of an embodiment of the present invention, integrally formed front and rear fixing plates are provided in the steering gear frame. Also, the vehicle body mounting connector and the control arm mounting connector are respectively disposed on and below the steering gear frame. Therefore, by changing the vehicle body mounting connector and the control arm mounting connector, the suspension system can be applied to various types of vehicle. That is, by changing two connectors, the suspension system can be used for a variety of vehicle.

Although preferred embodiments of the present invention have been described in detail hereinabove, it should be clearly understood that many variations and/or modifications of the basic inventive concepts herein taught which may appear to those skilled in the present art will still fall within the sprit and scope of the present invention, as defined in the appended claims.

What is claimed is:

1. A front-wheel suspension system, comprising:
   a steering gear frame including a front fixing plate and a rear fixing plate formed on a front side and a rear side of a power cylinder at both ends thereof, the fixing plates being coupled to a vehicle body;
   a control arm mounting connector fixedly disposed in a longitudinal direction under the fixing plates;
   a lower control arm provided with a vehicle body side connecting member that is coupled to both ends of the control arm mounting connector;
   a wheel carrier coupled to a wheel side end portion of the lower control arm and rotatably supporting a wheel, the wheel carrier being connected to a tie rod extended from the power cylinder;
   a damping device for absorbing vertical vibration of the wheel; and
   a vehicle body mounting connector that is disposed between the steering gear frame and the vehicle body;
   wherein the vehicle body mounting connector is provided with a pair of coupling holes configured to be coupled to the front and rear fixing plates, on both sides of a center portion thereof, and with a pair of vehicle body mounting holes configured to be coupled to the vehicle body, on both ends thereof,
   wherein a vehicle body mounting connector has an arc shape so that the vehicle body mounting holes are positioned nearer the wheel than the coupling holes are.

2. The front-wheel suspension system of claim 1, wherein the control arm mounting connector is provided with coupling holes configured to be coupled to the fixing plate on both sides of a center portion, and a front vehicle body connecting member and a rear vehicle body connecting member of the lower control arm are respectively coupled to a front end portion and a rear end portion of the control arm mounting connector.

3. The front-wheel suspension system of claim 1, wherein a front end portion of the control arm mounting connector is configured to be coupled to the lower control arm through a lateral rubber bushing, and a rear end portion of the control arm mounting connector is configured to be coupled to the lower control arm through a vertical rubber bushing.

* * * * *